A. REED.
ANIMAL-TRAP.
No. 186,624. Patented Jan. 23, 1877.
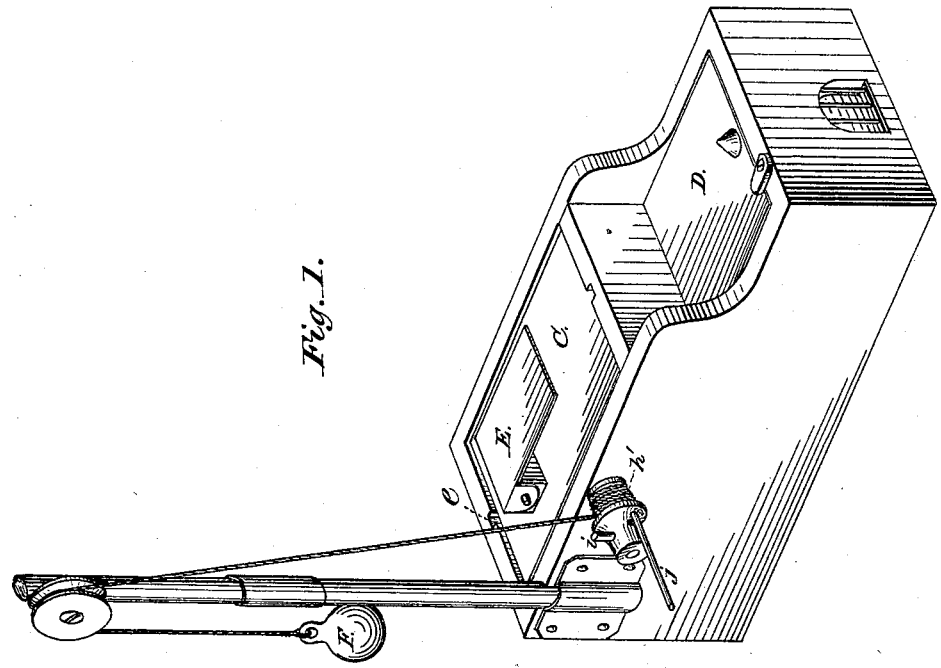
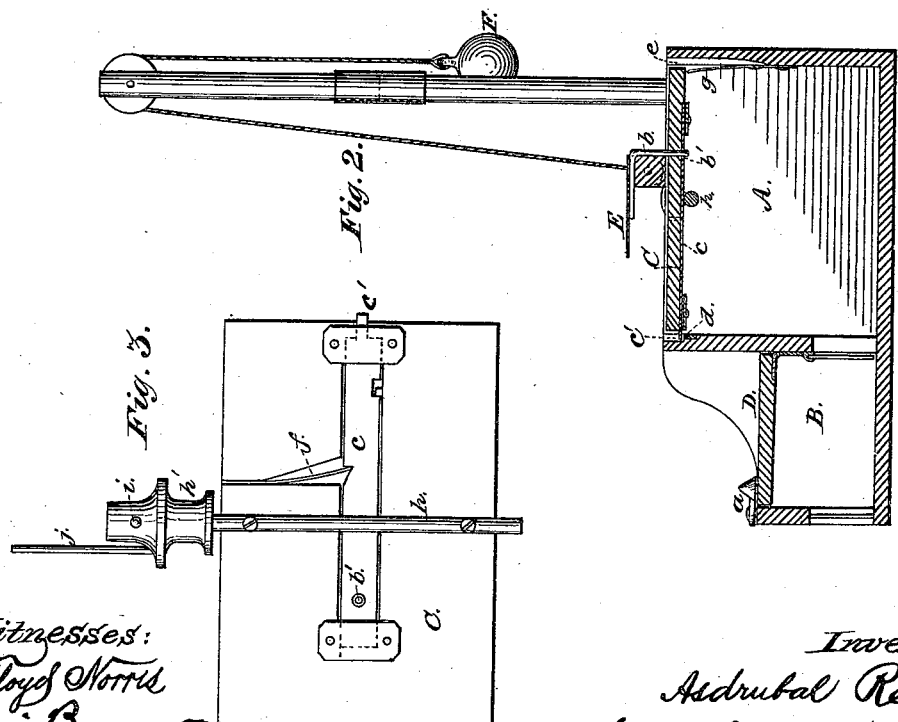
Witnesses:
Floyd Norris
Leo Bacon
Inventor:
Asdrubal Reed
by Johnson & Johnson
his Attys.

UNITED STATES PATENT OFFICE.

ASDRUBAL REED, OF OTTAWA, KANSAS, ASSIGNOR OF ONE-HALF HIS RIGHT TO W. G. GRABENDIKE, OF SAME PLACE.

IMPROVEMENT IN ANIMAL-TRAPS.

Specification forming part of Letters Patent No. 186,624, dated January 23, 1877; application filed December 13, 1876.

*To all whom it may concern:*

Be it known that I, ASDRUBAL REED, of Ottawa, in the county of Franklin and State of Kansas, have invented certain new and useful Improvements in Animal - Traps, of which the following is a specification:

My invention relates to that class of animal-traps in which the animal is caged by a tripping revolving platform, and not by entering a hole.

Briefly, the invention is as follows: A stepped platform, which, when the trap is set, is fixed, and which is removed to take out the caged animal, is immediately over the prison compartment of the trap, affords the first stepping-place of the rat. Finding it firm and safe, the rat ascends a step higher, and is upon a tilting revolving platform, which is also held by a spring-catch upon its under side. The animal (as is their custom) runs over and surveys this platform, and, being emboldened, soon ventures to tread upon the tripping tilting bait-carrier, which releases the catch before mentioned, and the platform, which is supported by a journal having its bearings in the side walls, tilts, and, revolving, immediately throwing the animal into the receiving-compartment, and reassuming its former position with the tilting bait-holder. The animal then enters the prison-compartment, from whence it may be removed, but cannot escape.

In the accompanying drawings, Figure 1 represents a view in perspective of an animal-trap embracing my invention; Fig. 2, a vertical longitudinal section of the same; and Fig. 3 a bottom view of the tilting platform and the cranked winding-spool.

The cage is in two compartments, a receiving-compartment, A, and a prison-compartment, B, the lid of the former being the tilting turning platform C, and the lid D of the latter being the first stepping place or stage of the animal, and considerably lower than platform C, as the drawings show. This lid D is made removable by suitable button devices $a$, to permit the caged animal to be taken out. The platform C is provided with a tilting bait-carrier, E, which, when the animal treads or pulls upon it, operates a rod, $b$, connecting at $b'$ with a sliding catch, $c$, upon the under side of said platform, and suitably secured thereto, to have a free movement, the point $c'$ thereof engaging with a stop-groove, $d$, in the wall of the compartment when the trap is set. At the other end of the trap is a groove, $e$, to permit the point $c'$ to move unobstructed as the platform turns. The tilting of the bait-carrier draws the point $c'$ of the catch from the groove-stop $d$, and the platform C immediately tilts, throwing the animal into the receiving-compartment, and turns entirely over, and resumes its position, carrying the bait-carrier with it, and the trap is reset. This is effected by a weight, F, and cord or other suitable means, such as a coiled spring, and the trap is reset by reason of the catch resuming its place in the stop-groove. This is effected by a spring, $f$, which throws the catch-point $c'$ forward into the stop-groove as the platform turns. A spring-support, $g$, is at the other end of the compartment near groove $e$, and acts as a support for the platform, yet permits free revolution. Upon the journal $h$ of the platform C is a winding-spool, $h'$, for the weight-cord. A key, $i$, locks this spool with the journal; but, in winding up the weight, this key is removed, and the spool is turned without affecting the axle or journal of the platform. The winding-spool is operated by a crank, $j$, to wind up the cord which carries the weight. The platform C, in revolving, carries the bait-holder with it, and the resetting of the platform also resets the tilting bait-holder.

It will be observed that the bait-carrier E consists of a shelf or platform, which is supplemental to the revolving platform, and is carried round by it to present the same bait upon the same platform every time the trap is sprung. This is essentially different from a four-winged platform, each wing having its sepatate bait-holder levers, springs, and catches.

I claim—

1. In an animal-trap, having a revolving platform, substantially as described, the combination, with such platform, of a tilting baitholding supplemental shelf or platform, supported and carried thereby, and a spring-catch, as and for the purpose described.

2. The tilting shelf E for the bait, arranged upon the platform C, and connected by rod *b* to the catch *c*, the shelf and platform turning together, to reset the same bait-shelf, as described.

3. The trap, consisting of the stepped platforms D and C, the tilting shelf E, its connected catch *c*, and the compartments A B, said tilting shelf serving as the bait-holder, substantially as herein set forth.

4. In an animal-trap, having a revolving platform, the combination, with such platform, its tilting bait-carrier, spring-catch, and weight, of the cranked winding-spool, and the removable key, as and for the purpose described.

In testimony whereof I have affixed my signature in the presence of two witnesses.

ASDRUBAL REED.

Witnesses:
AMHERST FRANKLIN,
JOHN W. YORK.